Figure 1:
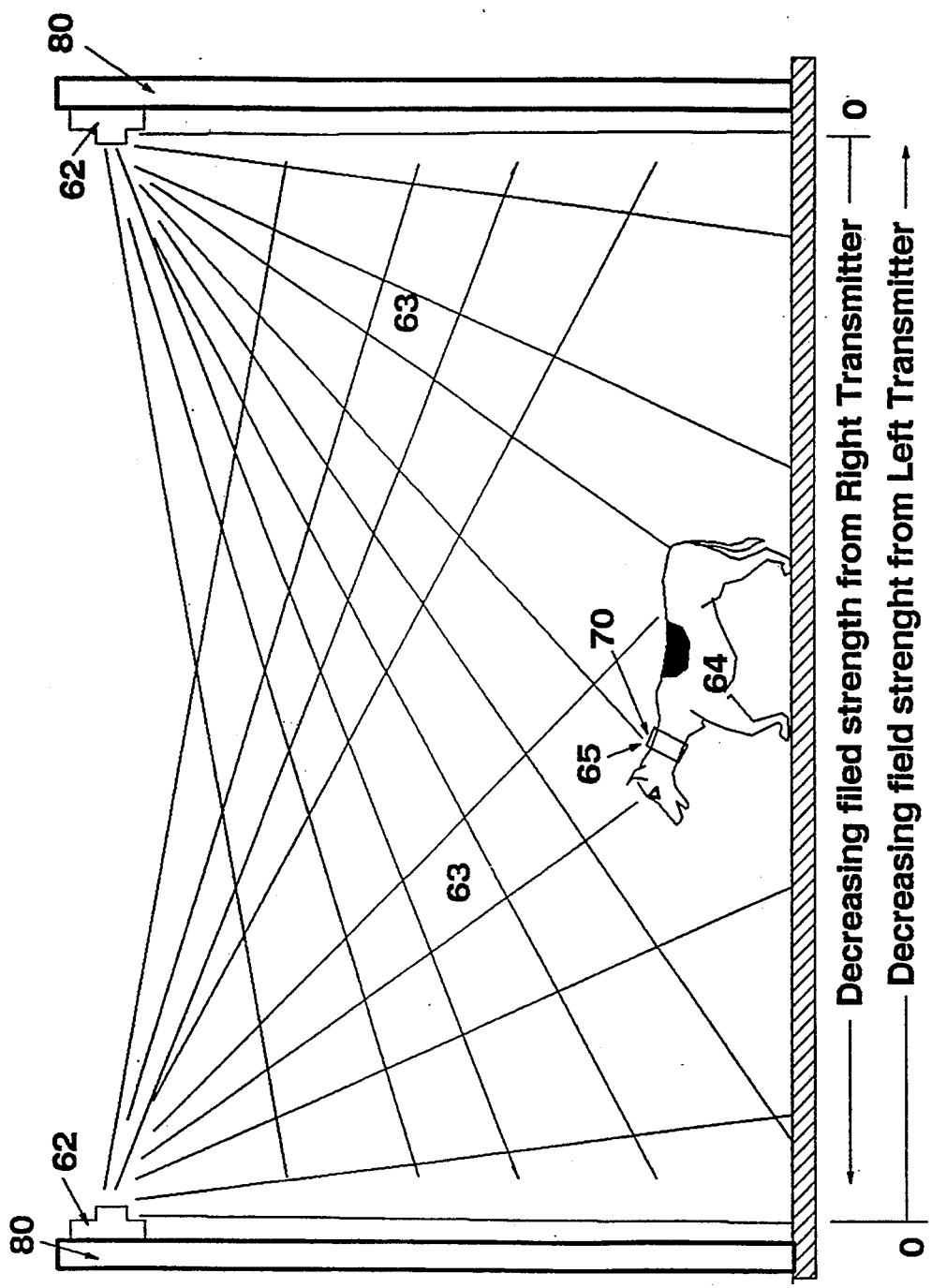

US005349926A

United States Patent [19]

McCarney et al.

[11] Patent Number: 5,349,926
[45] Date of Patent: Sep. 27, 1994

[54] ANIMAL CONTAINMENT SYSTEM

[75] Inventors: David A. McCarney; Frank A. Calabrese, both of Waynesboro; Kenneth B. Shockey, Greencastle, all of Pa.

[73] Assignee: Industrial Automation Technologies, Inc., Waynesboro, Pa.

[21] Appl. No.: 126,321

[22] Filed: Sep. 24, 1993

Related U.S. Application Data

[63] Continuation-in-part of Ser. No. 14,810, Feb. 8, 1993, which is a continuation of Ser. No. 867,892, Apr. 13, 1992, abandoned, which is a continuation-in-part of Ser. No. 94,075, Sep. 4, 1987, Pat. No. 5,113,962, which is a continuation of Ser. No. 820,644, Jan. 21, 1986, abandoned.

[51] Int. Cl.$^5$ ............... A01K 3/00; A01K 29/00
[52] U.S. Cl. .................. 119/721; 119/859
[58] Field of Search ............ 119/720, 721, 859; 340/573

[56] References Cited

U.S. PATENT DOCUMENTS 5,121,711  6/1992  Aine .................. 119/721
5,164,707 11/1992  Rasmussen et al. ........ 340/573 X

FOREIGN PATENT DOCUMENTS 3210002  9/1983  Fed. Rep. of Germany .
2076608 12/1981  United Kingdom ........ 340/573

Primary Examiner—Robert P. Swiatek
Attorney, Agent, or Firm—Spencer T. Smith

[57] ABSTRACT

An animal confinement system comprising an emitter for transmitting coded near infrared energy, a receiver carried by an animal to be contained for receiving the transmitted coded near infrared energy, including an infrared receiving diode and, a comparator for conditioning the output of the infrared receiving diode. A predetermined threshold is established for the comparator which will cause the output of the comparator to go low when the output of the infrared receiving diode is received.

10 Claims, 14 Drawing Sheets

ANIMAL CONTAINMENT SYSTEM

The present application is a continuation in part of Ser. No. 08/014,810, filed Feb. 8, 1993, which was a continuation of U.S. Ser. No. 07/867,892, filed Apr. 13, 1992, abandoned, which was a continuation in part of Ser. No. 07/094,075, filed Sep. 4, 1987, now U.S. Pat. No. 5,113,962, which was a continuation of Ser. No. 06/820,644, filed Jan. 21, 1986, abandoned.

An animal containment system is disclosed which is a static electronic energy conversion device consisting of two parts, a transmitter part and a receiver part. Being static, it contains no moving parts. A linear energy field of coded energy which may be viewed as a plane or curtain of energy, is transmitted along a linear corridor. The width, length, and even the curvature of this energy curtain may be adjusted to meet specific applications. The energy transmitted in this manner may be received by a receiver located anywhere within the curtain (plane). The strength of the energy will decrease in intensity as the energy field extends from the focal line of the curtain.

Encoded, superimposed or integrated within the energy curtain is a communication signal, which may be a frequency, pulses, modulated frequency, modulated amplitude, etc. The complementary receiver part located anywhere within the curtain (plane) of the transmitted energy will receive the energy, and decode the encoded signal. In this fashion communication will occur between the transmitter(s) and any receiver carried by an animal located within the curtain (plane).

Other objects and advantages of the present invention will become apparent from the following portion of the specification and from the following drawings which illustrate in accordance with the mandate of the patent statues presently preferred embodiment incorporating the principles of the invention.

Figure 2:
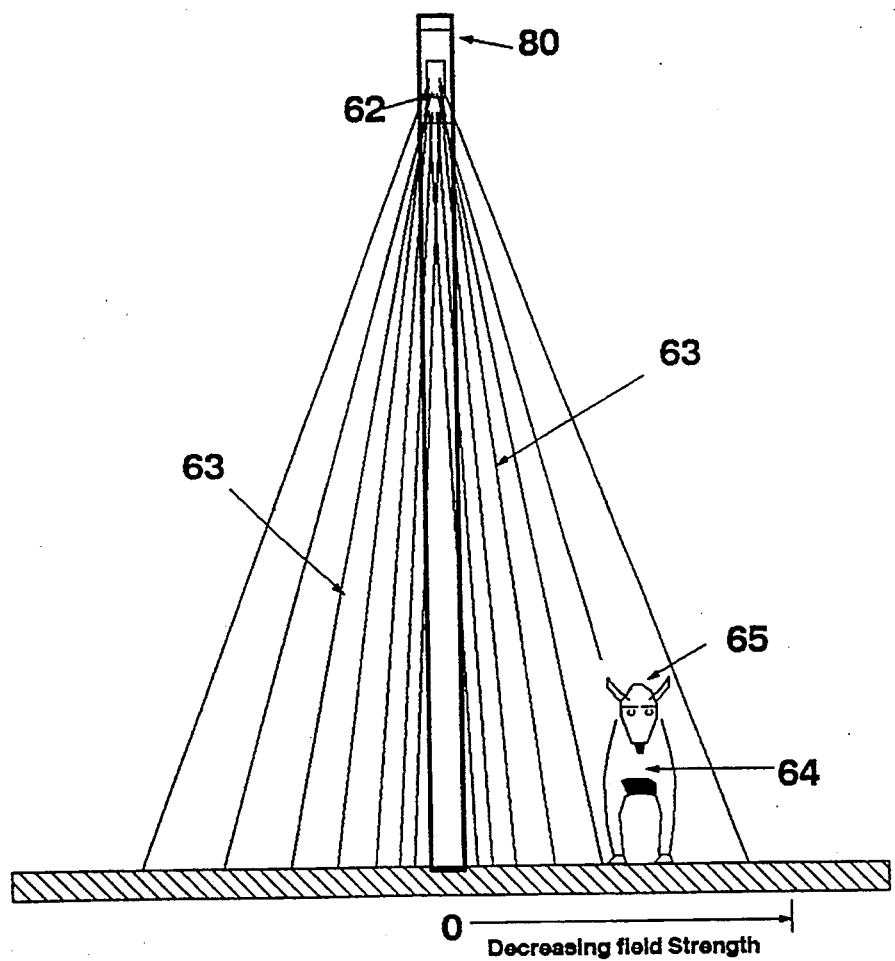
Figure 3:
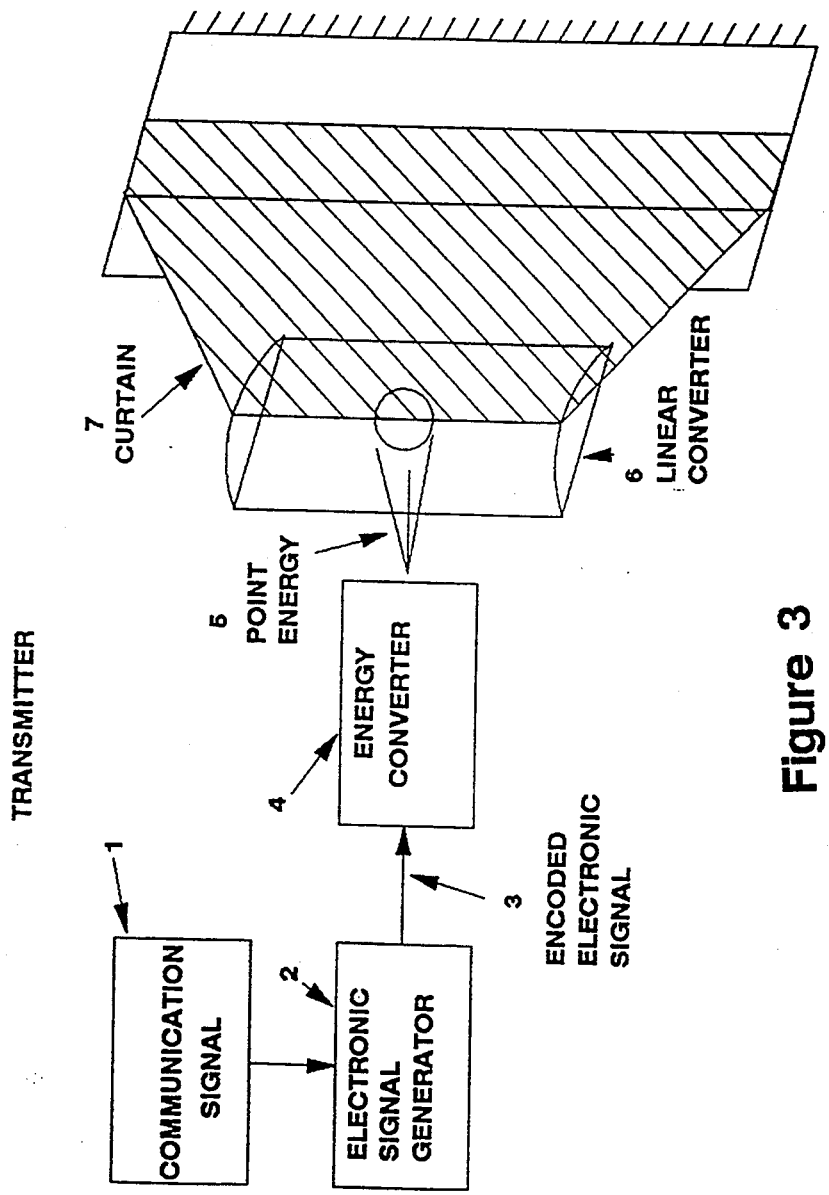
Figure 4:
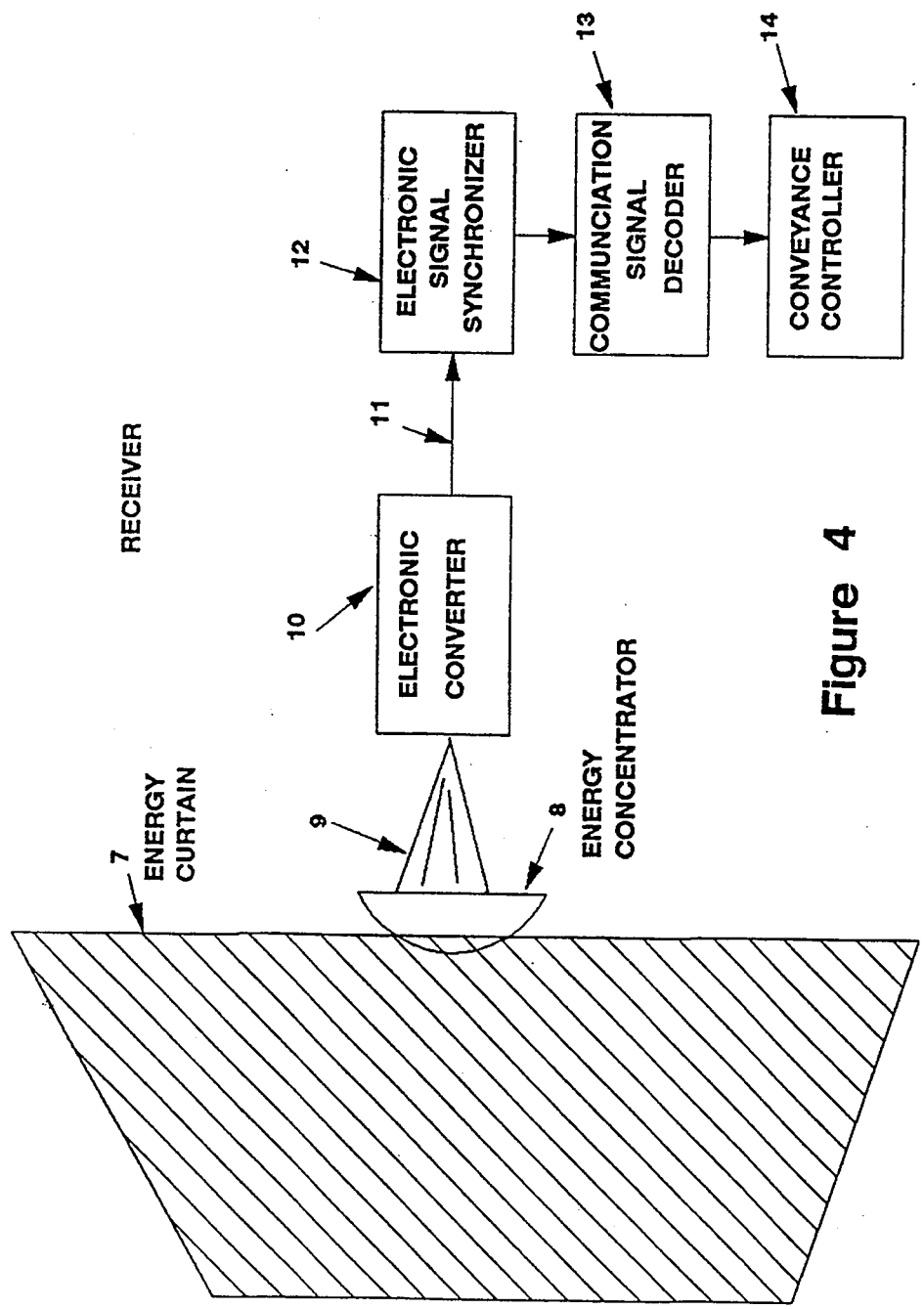
Figure 5:
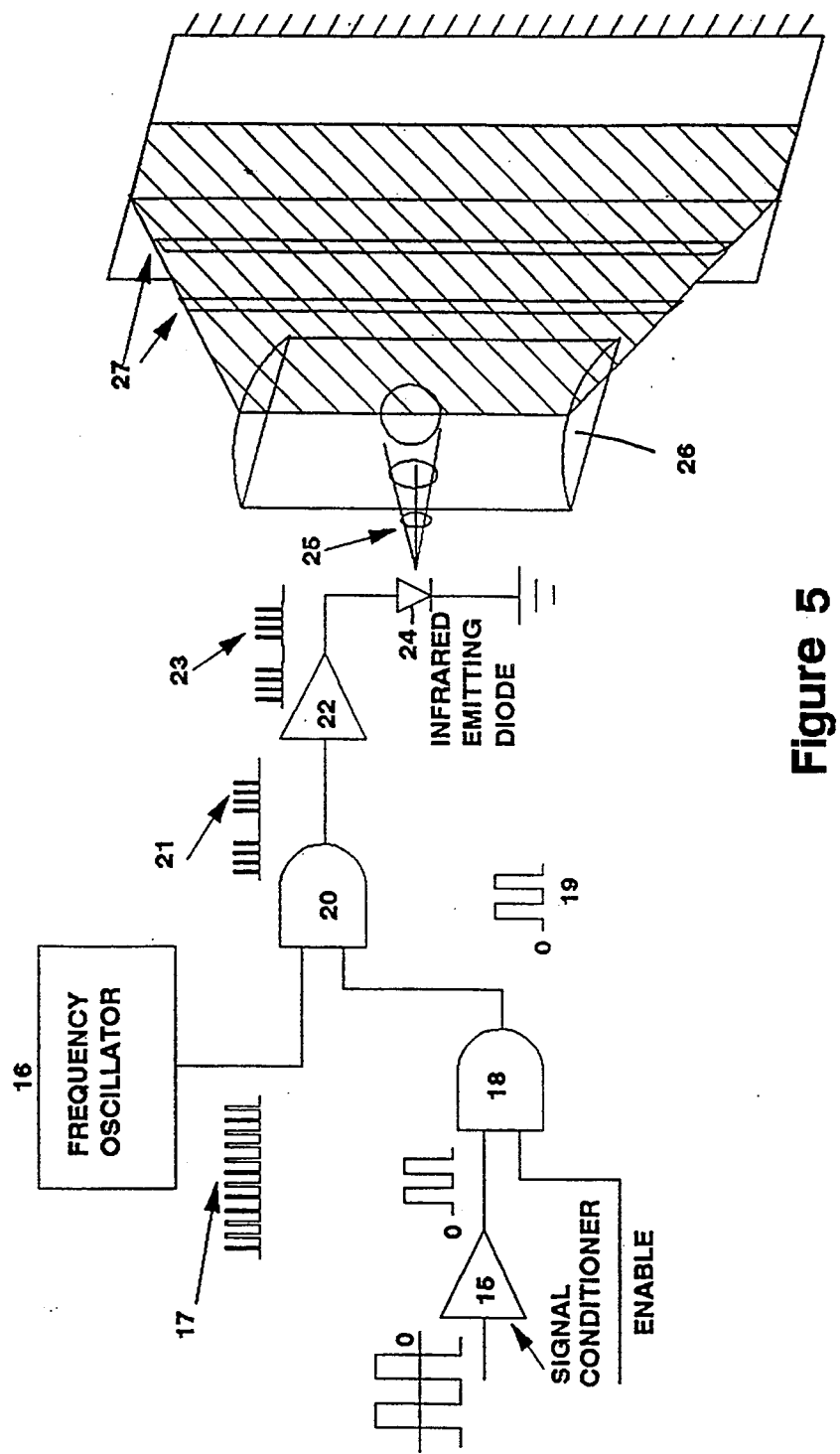
Figure 6:
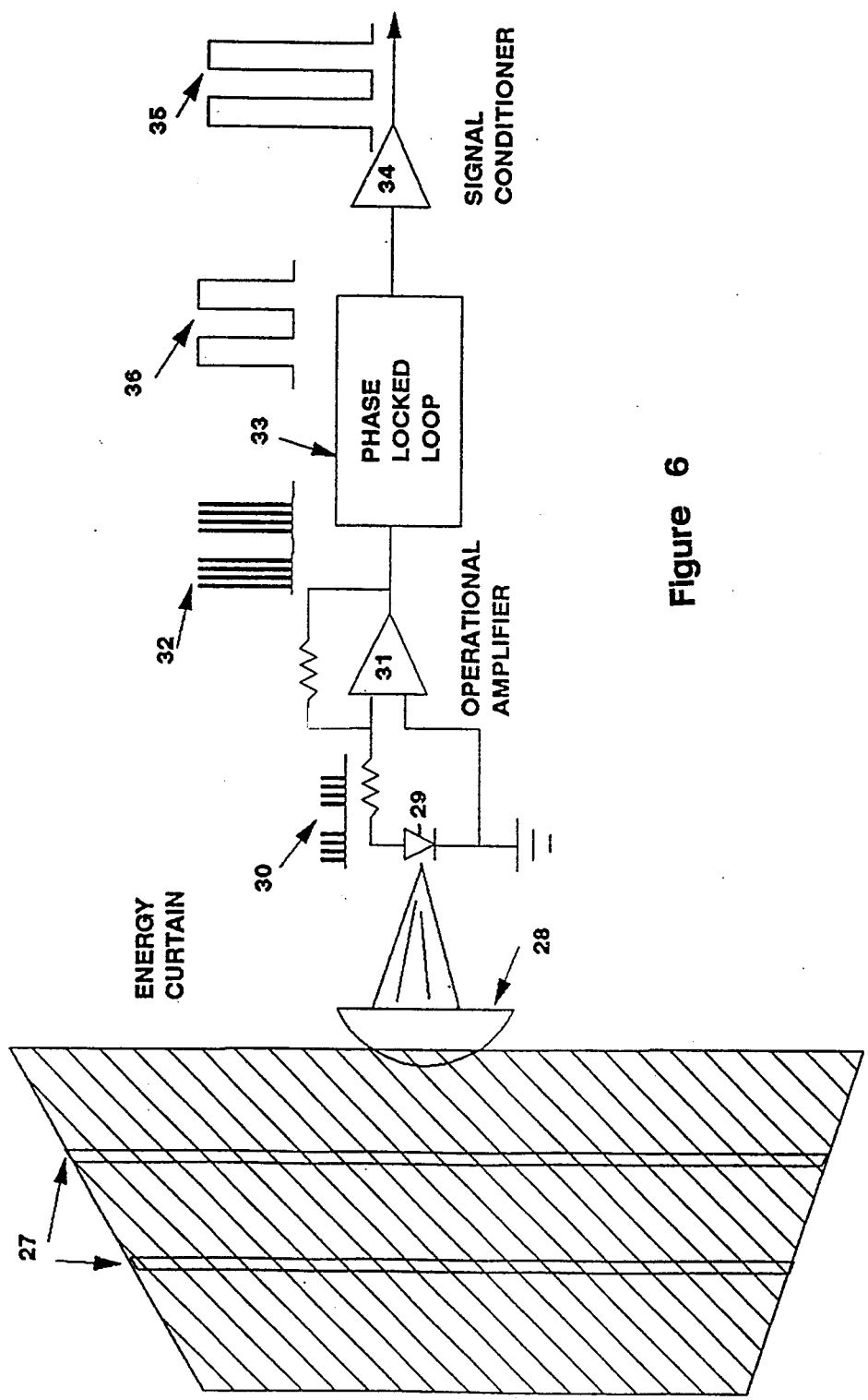
Figure 7:
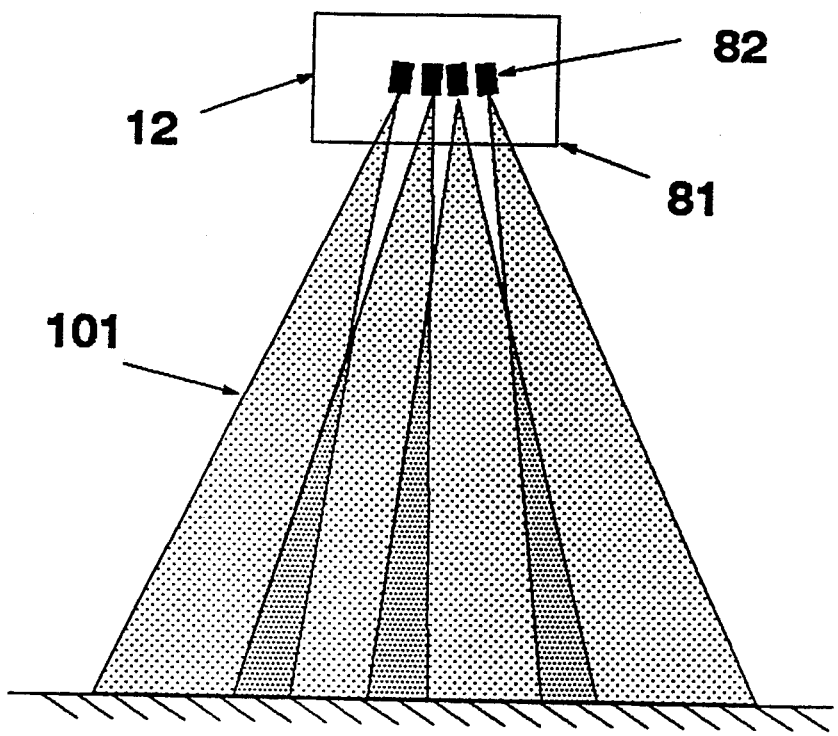
Figure 8:
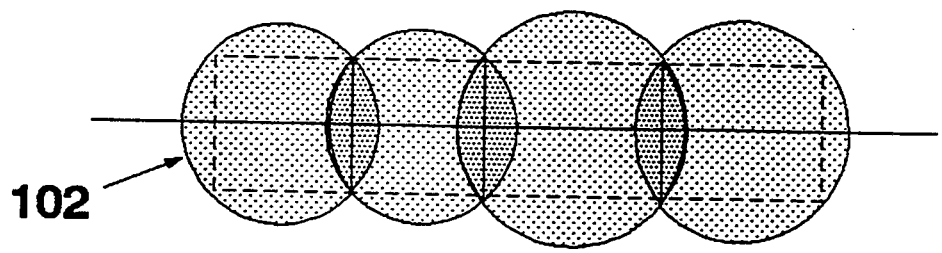
Figure 9:
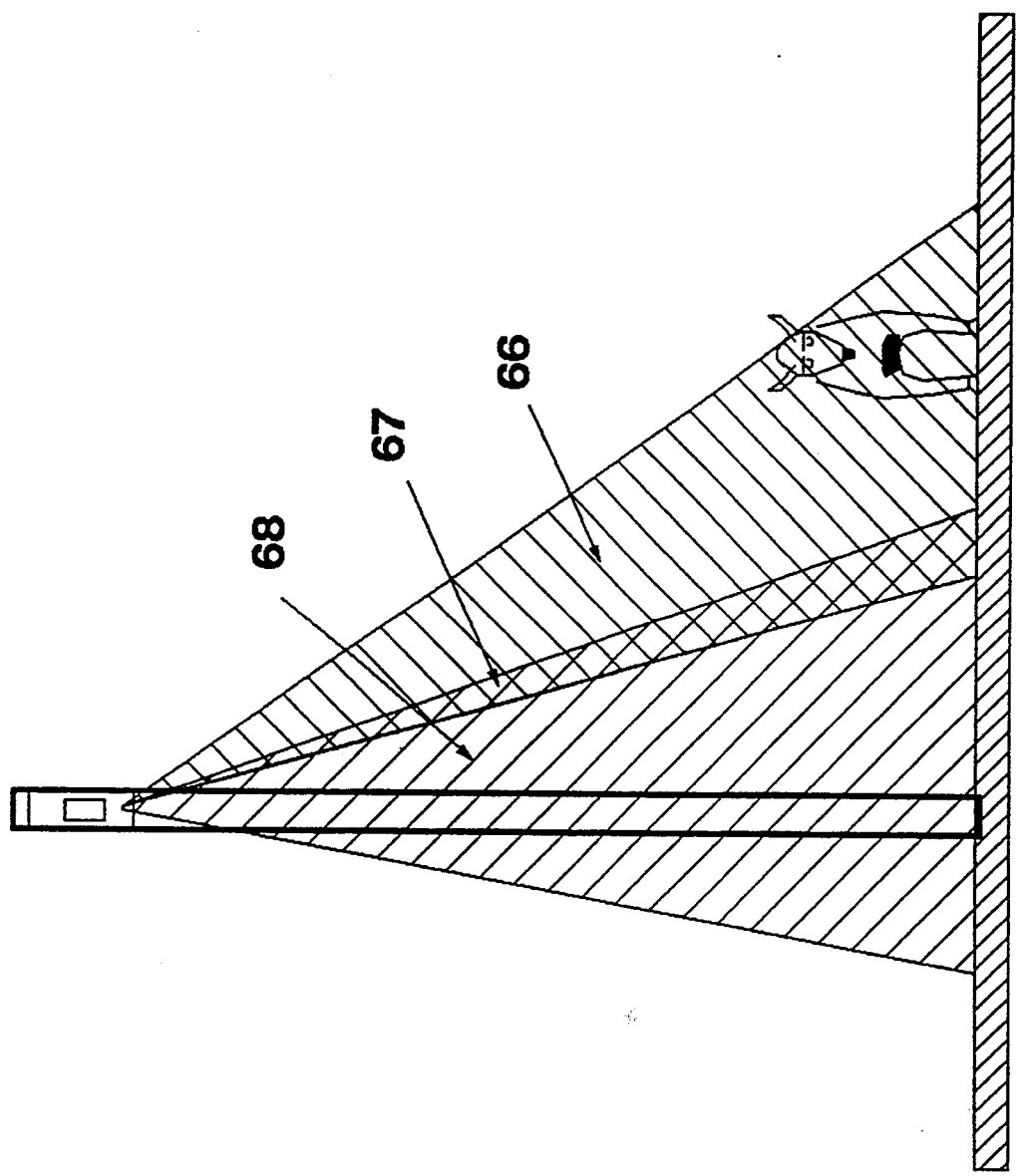
Figure 10:
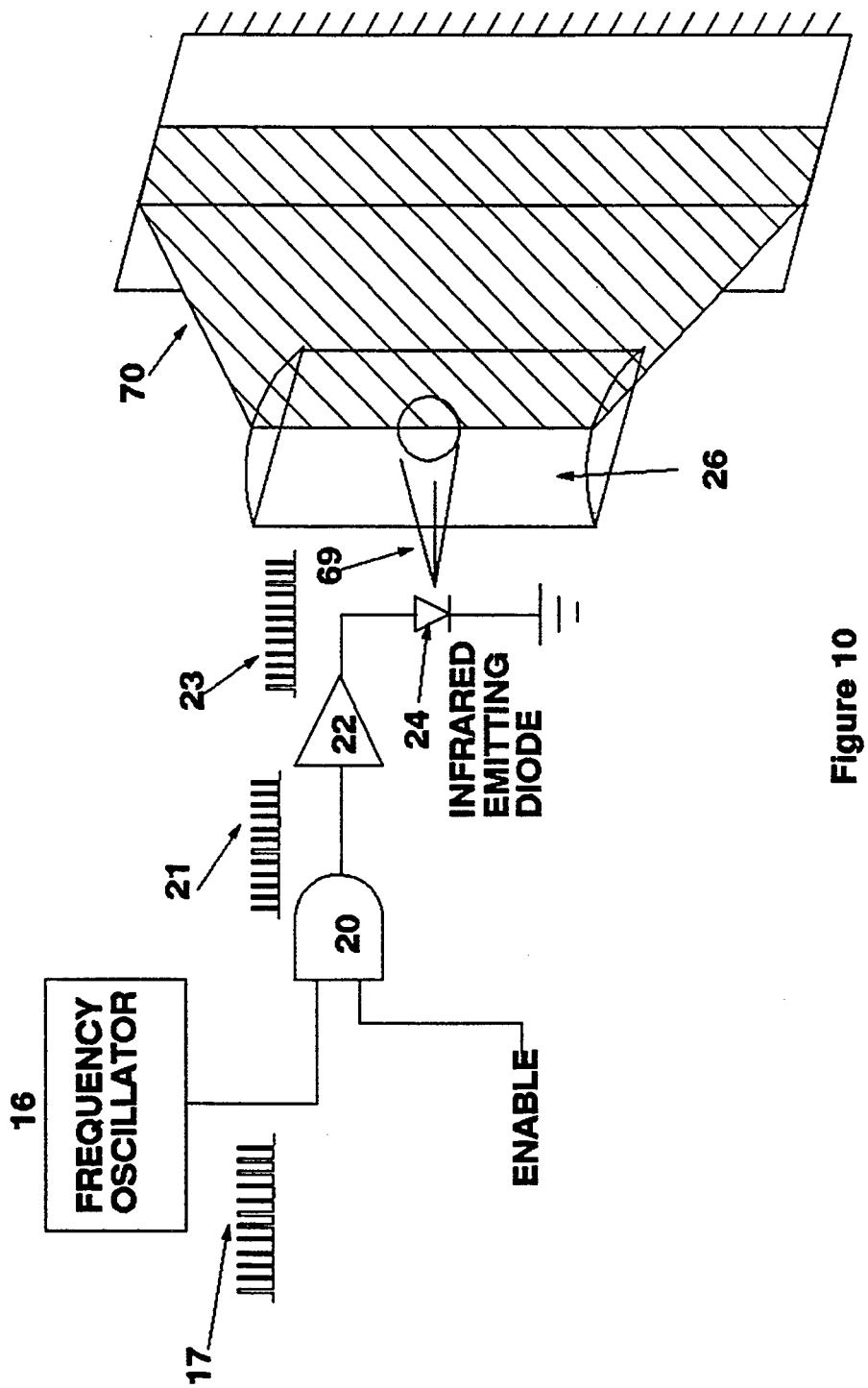
Figure 11:
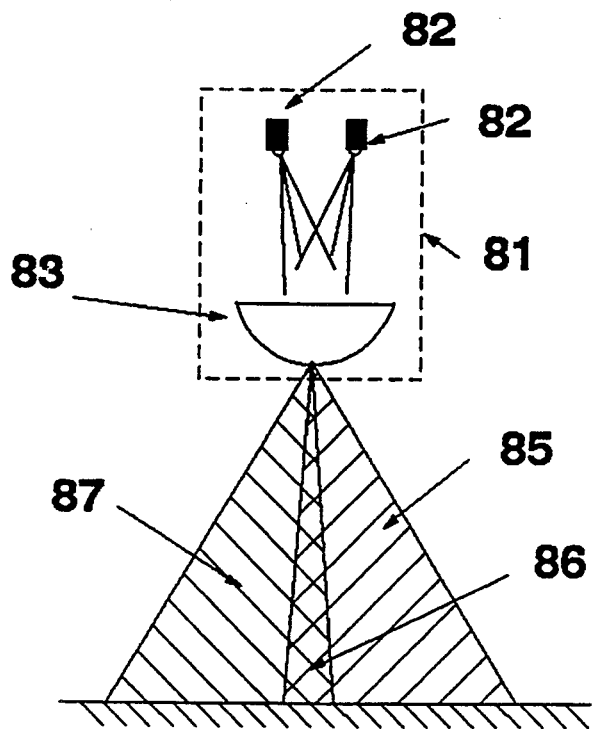
Figure 12:
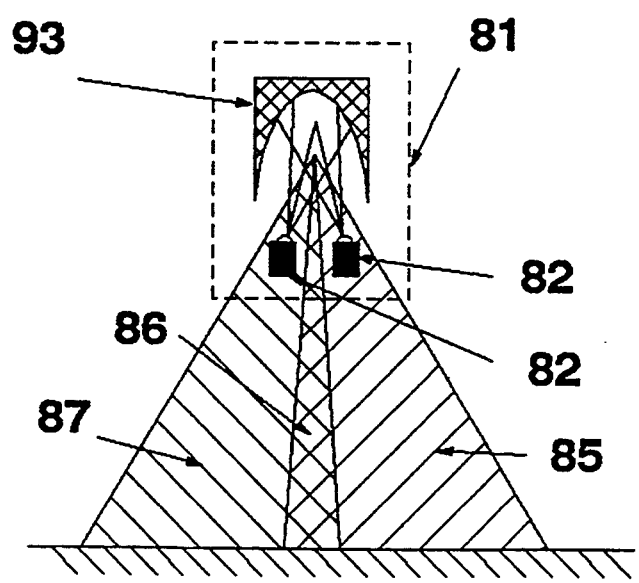
Figure 13:
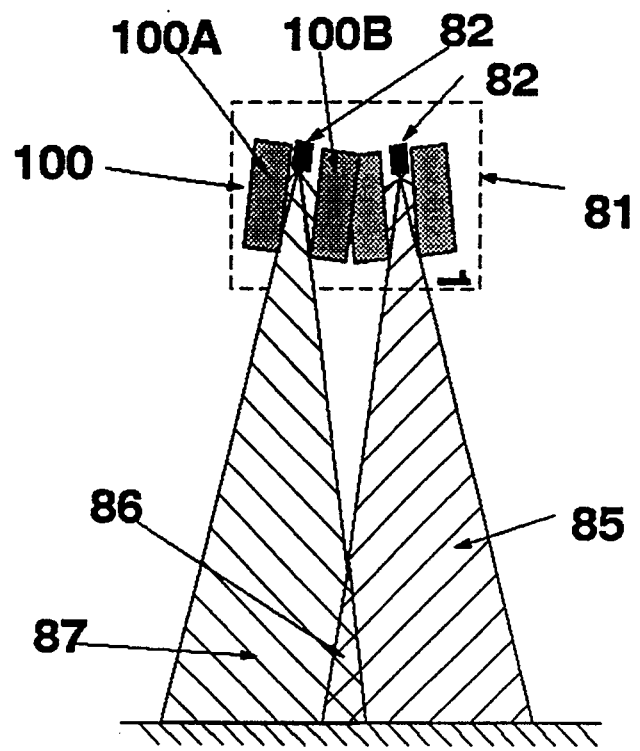
Figure 14:
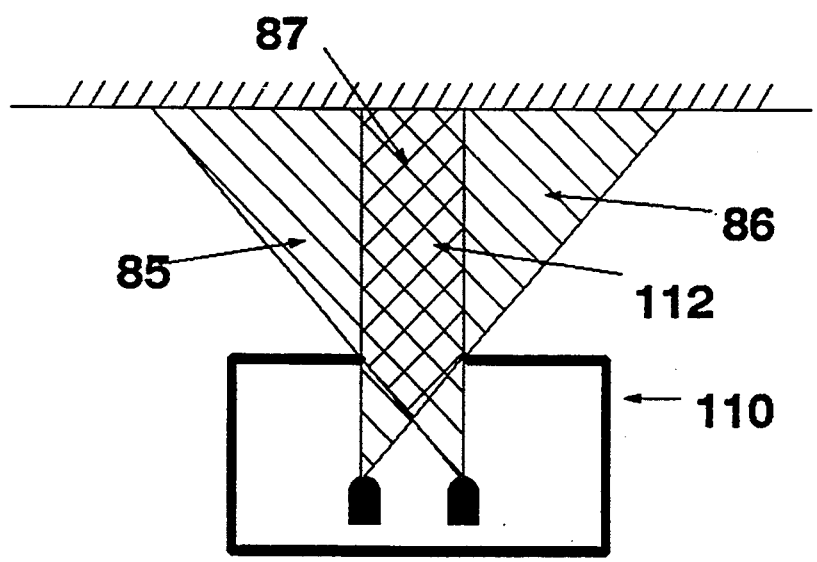
Figure 15:
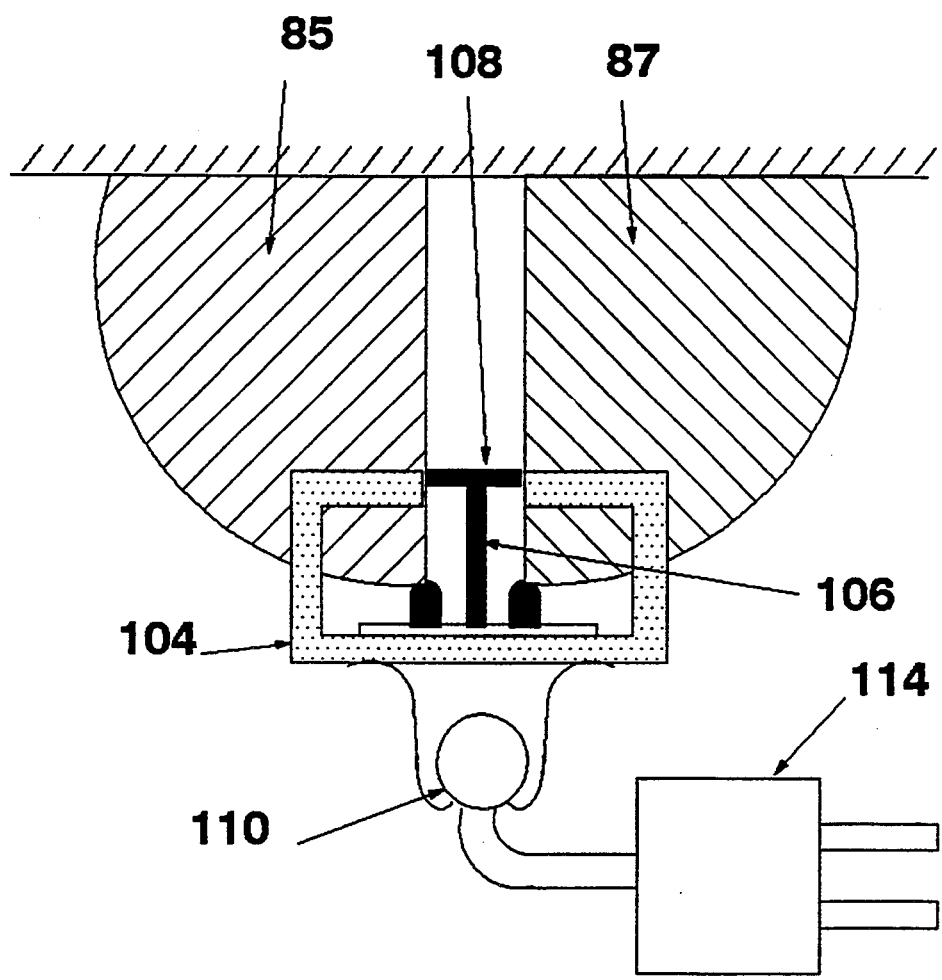
Figure 16:
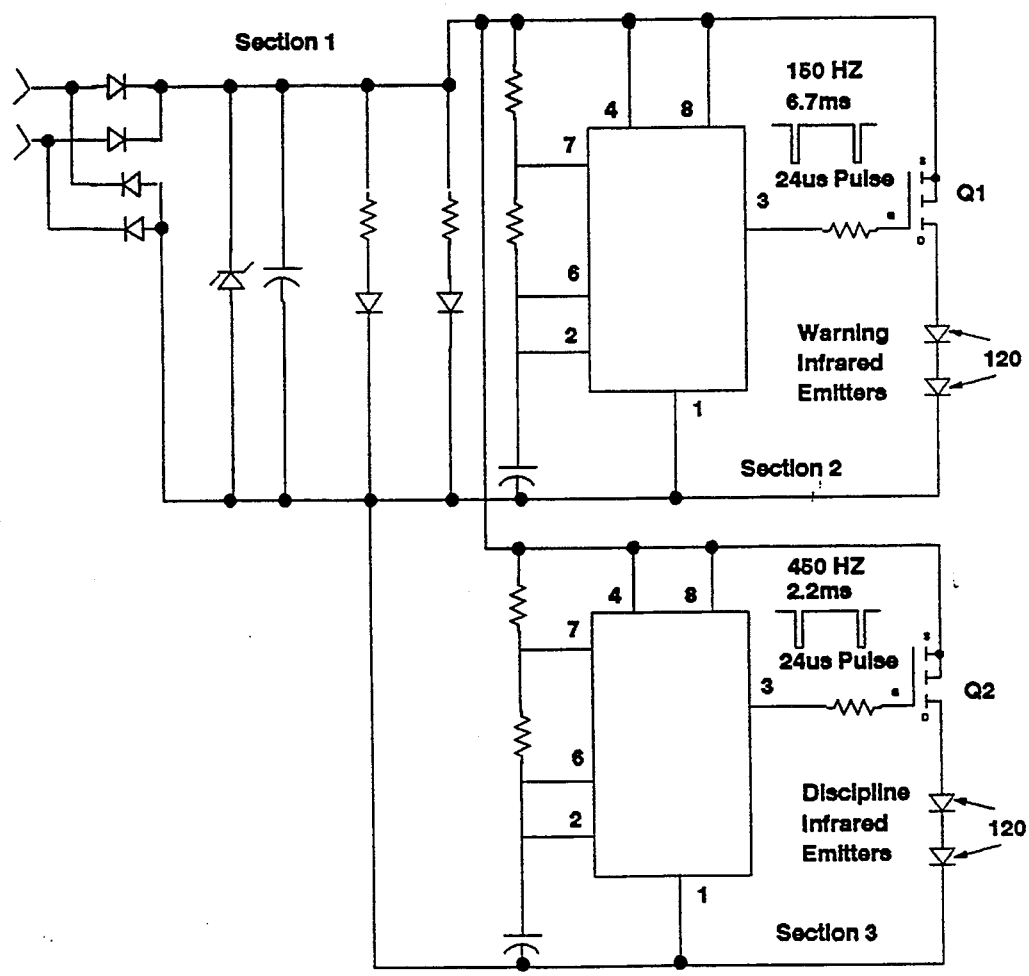
Figure 17:
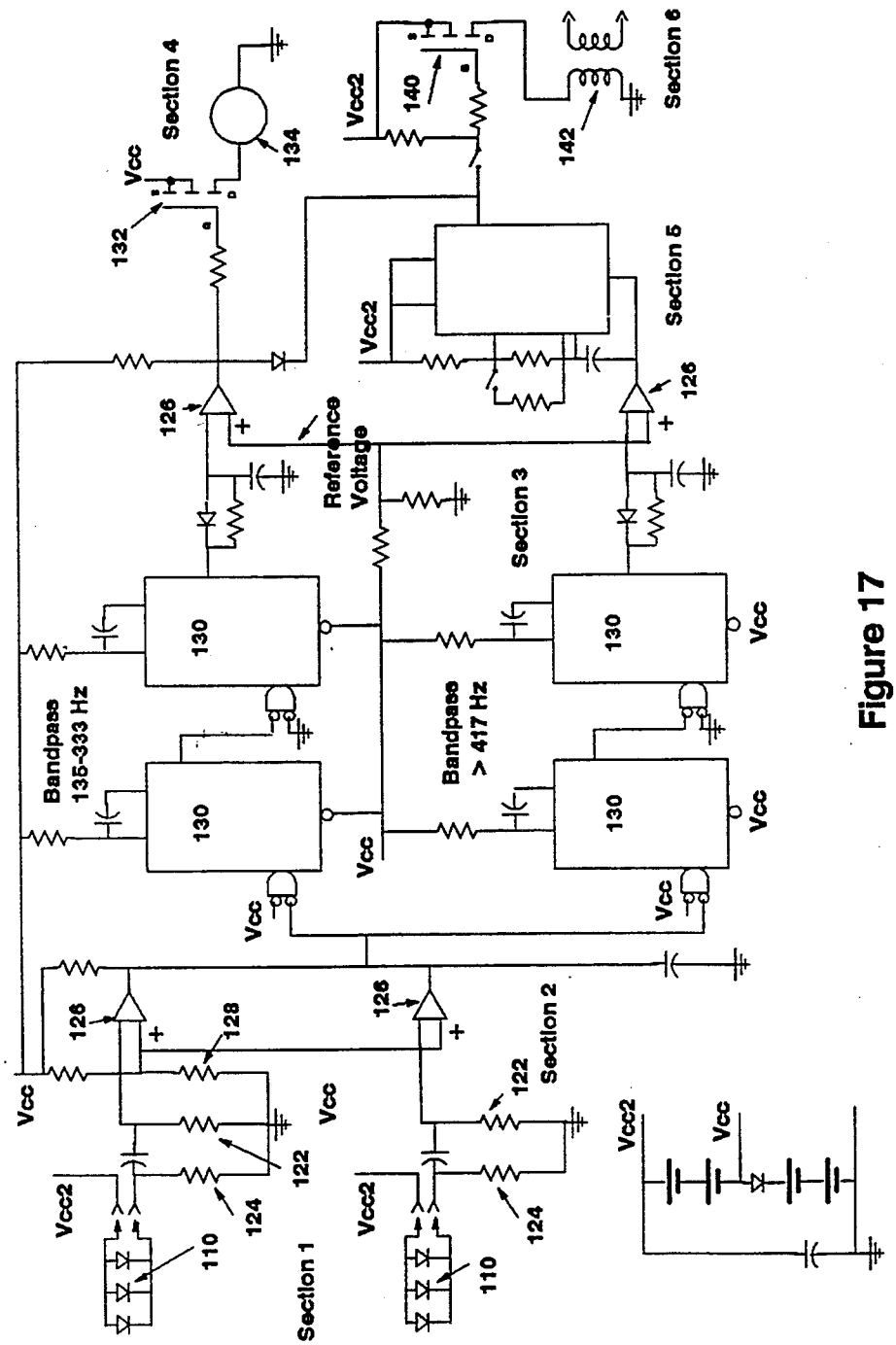

Referring to the drawings:

FIG. 1 is a side view of the animal containment system made in accordance with the teachings of the present invention, FIG. 2 is front view of the animal containment system shown in FIG. 1, FIG. 3 is a block diagram illustrating the transmitter of the animal containment system, FIG. 4 is a block diagram illustrating the receiver of the animal containment system, FIG. 5 is a block diagram of a transmitter for transmitting infrared optical energy, FIG. 6 is a block diagram of a receiver for receiving infrared optical energy, FIG. 7 is a side view using array optics to define a single energy curtain FIG. 8 is an overhead view of the system shown in FIG. 7, FIG. 9 is a front view of an animal containment system showing the overlapping of two linear energy curtains, FIG. 10 is a block diagram illustrating the transmission of infrared optical energy where the wave length is the code, FIG. 11 is a front view of an animal containment system establishing two overlapping energy curtains with the use of refractive optics, FIG. 12 is a similar view using reflective optics, FIG. 13 is a similar view using a first embodiment of masking optics, FIG. 14 is a view similar to that of FIG. 11 illustrating a second embodiment of masking optics, FIG. 15 is a view similar to that of FIG. 14 illustrating a third embodiment of masking optics, FIG. 16 is an electronic diagram illustrating a transmitter having a preferred embodiment, and FIG. 17 is an electronic diagram illustrating a receiver having a preferred embodiment.

An application example would consist of one or more stationary transmitters 62 as shown in FIGS. 1 and 2. The transmitters 62 send a linear curtain of energy (decreasing in intensity from the focal line) 63, encoded with a command along a boundary or perimeter. A moving or fixed receiver 65 attached to a conveyance 64, such as a domesticated animal to be contained, receives and converts the linear energy back into an electronic signal decoded to present information. The beam 63 extends a curtain along a border or boundary. The transmitter(s) can be mounted on suitable posts (for outdoor applications) or walls (for indoor applications) 80. The animal will be in continual communication with the transmitter (the animal wears a collar 70 which presents one or more receivers) so long as the animal is within the curtain of the transmitted linear energy beam. The communication occurs with no physical connection or wiring between the transmitter 62 and the animal 64.

Referring to FIG. 3, the block diagram of the transmitter 62, the communication signal 1 contains the information which is to be transmitted through the transmitter 62. This communication signal is integrated with the electronic signal generator 2 which results in an electronic encoded signal 3. This electronic encoded signal drives the energy converter 4, which generates a point source of encoded energy 5; this encoded energy immediately begins to disperse omni-directionally from its point source. It is now intercepted by the linear converter 6, which focuses the rapidly dispersing energy into a narrow line of encoded energy which may be directed along a prescribed curtain 7. A receiving device 65 either moving or stationary within the curtain of energy may now detect the encoded energy. This will only occur within the energy curtain. The block diagram of the receiving device, shown in FIG. 4, includes an energy concentrator 8 which will focus the linear energy into a point source 9. The point source of energy is focused onto an electronic converter 10 which converts the energy into an encoded electronic signal 11. The electronic synchronizer 12 is tuned to the electronic signal generated by the electronic signal generator 2. Upon recognizing the specified signal the signal is decoded by the communication signal decoder 13, and is transferred out to the conveyance (animal) controller, 14. The conveyance controller will convert the signal into an instructional command to the animal. This instructional command may take several forms, such as varying audible tones, electrical shock, or other instructional instruments.

The energy utilized can be anywhere within the frequency spectrum which could include, but is not limited to, audio, visible light, laser light, infrared, microwave, etc. Certain energy frequencies are better suited for individual applications. Near infrared optical energy (800 to 1000 nanometers) is very well suited for this environment. An infrared transmitting application is shown in FIG. 5. The incoming data signal is conditioned through a signal conditioner 15, and allowed to pass through "and" gate 18 only when enabled by an external signal (switch). The data signal 19 enables the higher frequency signal 17 which was generated by the frequency oscillator 16. Data pulses of encoded frequency 21 which issue from and gate 20 enter the current driver 22, which provides the encoded electrical signal 23 of sufficient current to drive the infrared emitting diode 24. This provides sufficient current to generate the infrared energy pulses 25 corresponding to the encoded electrical signal. These infrared data pulses enter the cylindrical lens 26 which converts the omnidirectional energy pulses into linear energy pulses 27. The linear energy pulses are transmitted along the direction of a defined corridor.

The infrared receiver shown in FIG. 6 may be either moving or stationary within the corridor, and receives the linear energy pulses 27. The lens 28 focuses the linear energy onto the infrared receiving diode 29. This then generates an electrical signal 30 of the encoded data. The encoded electrical signal is amplified by the operational amplifier 31 into a useable electrical signal 32 which enters the phase locked loop circuit 33, which is synchronized to the originally generated and transmitted frequency from the frequency oscillator 16. This circuit results in decoded pulses 36 which correspond to the original data from the signal generator 15. These decoded data pulses are conditioned by a signal conditioner 34, and the conditioned pulses 35 are converted into instructional commands to the animal. The linear energy curtain may be applied to contain animals within a prescribed boundary. This includes keeping the animals away from restricted zones. This would form a continuous curtain of invisible linear energy at a perimeter or boundary. Any linear energy receiver entering the curtain (corridor) of the linear energy would be subject to the instructional command. The linear energy curtain would transmit a continuous signal within its curtain.

As shown in FIGS. 7 and 8, a curtain could be defined by a linear array of point sources in the form of LED devices 82. Each LED 82 emits energy substantially in the form of a cone 101 which defines an angle about its axis. By tilting the LED's these conical energy cones can be overlapped to define the desired vertical wall or curtain 102.

Two curtains 66, 68 could be transmitted side by side and possibly overlapping defining a third curtain having both codes to provide different instructional commands to the animal. This is shown in FIG. 9. In this configuration two linear energy transmitters would be employed to transmit two different energy curtains containing two different codes. The receiver located on the conveyance (animal) would be capable of receiving and decoding both codes. As the animal entered the first curtain 66, this signal would be decoded, and the appropriate instructional command (an audible tone, for example) issued to the animal. As the animal entered the overlapping curtains corridor 67, two codes would be received and decoded. The animal would receive a second and perhaps different instructional command. As the animal proceeded to the corridor occupied solely by the second curtain 68, the animal would then receive an additional instructional command (an electrical shock, for example). The instructional commands would be selected to best deter the animal from entering and going through the boundary. Having the two curtains adjacent but not overlapping simplifies the electronics since only one code will be present in each curtain.

In a similar manner, a plurality of transmitters and linear energy curtains may be employed to provide a plurality of instructional commands.

The electronics within the receiver would be capable of receiving all the signals provided by the transmitters and subsequently converting these signals into the desired instructional commands. The instructional commands therefore would vary depending upon the relative position of the receiver (animal) to the boundary established by the linear energy curtains.

Most types of radiated energy can be utilized for this function. However, near infrared energy offers a very safe and practical frequency range for this specific requirement. Electronic signals are generated which contain the code to be transmitted. These electronic signals are converted to infrared utilizing electronic devices manufactured for the purpose. The infrared energy generated begins to disperse until it contacts the cylindrical optical lens which linearizes the energy into line which disperses into a plane or curtain. The shape and size of the curtain is established by design. The infrared energy curtain is focused onto a prescribed boundary, thus generating the linear energy only where desired. Any receiving device within the curtain only may receive the coded energy signals. These signals are decoded to provide an instructional command to the animal, warning it to remain within the prescribed boundary. This provides a new and unique method of establishing perimeter for animal control.

In addition to encoded infrared transmitted signals, the basic infrared optical energy could also be utilized as a means for establishing an invisible curtain as shown in FIG. 10. The absence and presence of the infrared energy of a specific wavelength (the code) could be detected by the receiver on the collar as an indication that the animal is within the invisible curtain field, and a subsequent instructional command could be issued to the animal.

The intensity of the field decreases as the field disperses from the lens, 26. Optionally, circuitry in the collar could be devised which would sense the change in field strength as the animal moves into and through the field towards the boundary. This change in magnitude of the field strength would be detected and an appropriate instructional command could be issued to the animal in direct relationship to the magnitude of the field strength. Multiple fields could be transmitted utilizing multiple circuitry. Each field would have unique data characteristics.

For the infrared field of FIG. 10, where the frequency is the code, a second infrared field of different wavelength from the first would be transmitted. This second infrared field would be of a unique infrared wavelength from the first field. A second circuit would transmit through a different infrared emitting diode 24, which would transmit a different infrared wavelength through the same or separate optics 26. The receiving collar would have circuitry and optics included which would detect both of the unique infrared energy fields and be capable of distinguishing between the two. An appropriate instructional command would be issued to the animal for each of the fields that it enters. Likewise, a plurality of fields may be transmitted and received.

The contour of this energy and the resulting projections may be established as discussed below.

Refraction Optics

Referring to FIG. 11, the infrared energy generated within transmitter 81 by the point energy sources 82 begins to disperse until it contacts the cylindrical optical lens 83 (shown in edge view) which linearizes the conically shaped (omnidirectional) energy from each point source into a wedge which disperses into a plane or curtain. The shape and size of the curtain are established by design of the length and focal length of the lens. The length, width, and overlap of the energy are established by design, and are established into two or three separate zones. The zones are defined as 85—the first warning zone, 86—a second optional warning zone and 87—the correctional zone. The infrared energy curtain is focused onto a prescribed boundary, thus generating the linear energy only where desired.

Reflection Optics

Referring to FIG. 12, the infrared energy generated within transmitter 81 by a point energy source 82 begins to disperse until it contacts the reflective mirror 93 (shown in edge view) which focuses or linearizes the energy from a conical shape into a wedge which disperses into a plane or curtain. The shape and size of the curtain is established by design of the length and focal length of the mirror. The length, width, and overlap of the energy are established by design, and are established into three separate zones. The zones are defined as 85—the first warning zone, 86—an optional second warning zone and 87—the correctional zone. The infrared energy curtain is focused onto a prescribed boundary, thus generating the linear energy only where desired.

Masking Optics

Referring to FIG. 13, the infrared energy generated within each transmitter 81 by a point energy source 82 begins to disperse until it contacts the mask 100, (shown in edge view) which masks the conical shape of the energy so that further dispersion is in the form of a substantially rectangular wedge which disperses into a plane or curtain. In the embodiment shown in FIG. 13, each mask 100 has an inner portion 100A which truncates one side of the conical energy form and has an outer portion 100B which truncates the opposite side of the conical energy form. A curtain which is substantially rectangular in cross section is thereby defined. By so masking the two sources, the curtains 85, 87 containing the warning and instructional commands can be separated and if desired, a third intermediate curtain 86 having both codes can be defined. The shape and size of the curtain is established by the geometrical design of the length, width and placement of the point energy sources 82 within the mask. The length, width and overlap of the energy are established by design and are established into three separate zones. The zones are defined as 85—the first warning zone, 86—a second warning zone and 87—the correctional zone. The infrared energy curtain is masked to establish a prescribed boundary, thus generating the linear energy only where desired.

A second masking embodiment is shown in FIG. 14. Here the masking is external in the form of a closed box 110 having a slit 112 formed so that warning 86 and instructional 88 curtains are separated by a third curtain 87 containing both codes. In FIG. 15 the box 104 is made from a transparent material such as clear plastic and an internal mask having an outwardly projecting portion 106 and a transverse portion 108 at the outer end thereof is used to define adjacent, separated warning and instructional curtains. This embodiment is ideally suited to project the curtains from the side, as would be the case if the housing included a universal joint connection 110 to a supporting piece 112, which could be inserted into a wall plug 114 to provide the required power. By reducing the width of the transverse portion and, if necessary, shortening the outwardly projecting portion, a third (two code curtain) could be defined between the warning and instructional curtains.

The transmitter circuit shown in FIG. 16 is comprised of three circuit sections.

Section 1

The first section limits the input power voltage, filters the input voltage and rectifies the input voltage. It also contains two visible light LED's, one red and one yellow, which are located in the assembly associated with the LED's generating one curtain, give guidance to the installer to aid in the mounting of the transmitter package. This first circuit is comprised of four diodes, one capacitor, two LED's and one Zener diode.

Section 2

The second circuit section is a standard oscillator which turns on a power FET to enable high current pulses 20–25 microseconds wide with a repetition rate of 150 Hz to pass through a number of series connected infrared emitting diodes 120. While two are shown, three or more may be preferable. The emissions from these diodes form the infrared warning signal and establish through its packaging the area in which the receiving device on the collar will cause the receiver's buzzer to sound continuously.

Section 3

Circuit section three is identical to section two except that the timing components on the oscillator result in an output pulse that causes its infrared emitters 120 to be on for 20–25 microseconds with a repetition rate of 450 Hz. When this signal is received by the collar it will result in the animal receiving a disciplinary action.

The receiver circuit shown in FIG. 15, which is mounted in the dog collar assembly, is comprised of six basic sections.

Section 1

Section one is comprised of two spaced sets of infrared receiving diodes with each set containing up to typically six infrared diodes connected in parallel. These diodes which are visible light filtered and have built-in wide angle lens may be disposed to accept energy from opposite aspects of the conveyance and may be tilted to better cover a variety of angles for receiving the coded energy.

Section 2

Section 2 is comprised of two identical high-pass RC filter circuits 122 (one filter circuit for each set of receiving diodes) and signal threshold detection logic. The filters use passive components to perform the functions of a first order high-pass filter. The purpose of these filters is to eliminate the 60 Hz and 120 Hz sinusoidal infrared components associated with ambient indoor lighting. These two filters are preceded in the circuit by a resistor 124 which is in series with the infrared receiver diodes and ground. This resistor provides a current path across which to generate a voltage which is representative of the intensity of the input infrared signal. The two signals that are used for detection are as follows. The warning zone signal is a 25 microsecond pulse which occurs at a repetition frequency of 150 Hz. The discipline or shock zone is detected by the reception in the receiving diodes of a signal that is a 25 microsecond pulse that occurs at a 450 Hz repetition rate. The RC filter should actively pass the legitimate warning and discipline signals with minimal attenuation because their wave shape being square causes them to appear as the timing equivalent of a high frequency sine wave (approximately 18000 Hz). The outputs of these first order filters are put into comparators 126 and when the infrared signal exceeds the predetermined threshold established for the comparator by resistor 128 the output of the comparator goes low. The two outputs of the comparators are connected so that if a signal is detected at either one, it will be passed onto the next circuitry section as a logic low signal level for roughly 25 microseconds. Essentially, the comparators convert a very low level input event to typical logic levels for processing by subsequent electronics and hence, function as a signal conditioner set to a very low threshold at which the output of the LED's is supplied to the rest of the circuitry, it is extremely sensitive and can pick up very weak signals.

Section 3

Section 3 is comprised of two frequency range detectors. It is comprised of two structurally identical circuits with different timing components. Each digital filter is comprised of successive one shots 130 followed by an RC smoother or integrator and a comparator 126. The one digital filter detects the presence of a warning signal only. The second digital filter detects the presence of a discipline signal and also detects the discipline signal if the warning signal is also present. Each digital filter functions in two stages. If the input frequency is sufficiently high to trigger the first stage before it times out, its output will always remain high and not allow the input pulse to be transmitted onto the next stage. Thus, the first stage eliminates frequencies above the desired pulse rate to be detected. The second stage of each filter is also a one shot whose output will go low if the repetition rate at its input is not high enough. Each succeeding circuit with the diode assures that spurious events are rejected and when coupled with the comparator will indicate by the comparator output going low that the input signal falls within the acceptable frequency band and represents a legitimate instructional signal.

Section 4

This section is comprised of a transistor 132 enabled sounder 134 which provides a warning tone whenever the warning zone is occupied. The sounder is enabled when the output of the warning zone digital filter is low.

Section 5

Section 5 is comprised of an oscillator which is enabled by the output of the digital filter which detects when the penetration of the discipline or shock zone occurs. The output of the oscillator can be switched to perform in one of two modes. It can cause the sounder to beep off and on or it can provide for the sounder to beep and the animal to be shocked if the switch setting is reversed. The rate at which the shock will occur, the intensity of the shock, and rate at which the buzzer beeps in the discipline zone can be caused to operate at one of two levels by a switch which adds or removes a parallel resistor in the oscillator timing components.

Section 6

The sixth section is comprised of a transistor 140 and a high turns ratio transformer 142 which will provide a high voltage but low energy shock at a rate which is controlled by the oscillator.

We claim:

1. An animal confinement system comprising
   means for transmitting coded near infrared energy,
   means to be carried by an animal to be contained for receiving said transmitted coded near infrared energy, including
   infrared receiving diode means,
   a comparator for conditioning the output of said infrared receiving diode means, and
   means for establishing a predetermined threshold for said comparator which will cause the output of the comparator to go low when the output of said infrared receiving diode means is received.

2. An animal confinement system according to claim 1, wherein said infrared receiving diode means comprises a plurality of parallel connected diodes.

3. An animal confinement system according to claim 2, further comprising an RC filter intermediate said infrared receiving diode means and said establishing means.

4. An animal confinement system according to claim 2, further comprising a filter intermediate said infrared receiving diode means and said establishing means.

5. An animal containment system according to claim 4, wherein said filter is an R.C. filter.

6. An animal containment system according to claim 1, further comprising
   means for decoding the output of said infrared receiving diode means, and
   means for issuing an instruction to the animal responsive to the decoded output of said infrared receiving diode means.

7. An animal containment system according to claim 1, wherein said transmitting means comprises means for transmitting near infrared energy having first and second codes and wherein said issuing means comprises means for issuing a first instruction responsive to said first code and a second instruction responsive to said second code.

8. An animal containment system according to claim 7, wherein said first instruction is a warning and said second instruction is disciplinary.

9. An animal containment system according to claim 7, wherein said decoding means includes means for discriminating between the output of said infrared receiving diode means when said transmitting means transmits near infrared energy having said first code and the output of said infrared receiving diode means when said transmitting means transmits near infrared energy having said second code.

10. An animal confinement system according to claim 7, wherein said transmitting means comprises first and second infrared emitting diode means, said first infrared emitting diode means emitting one of said codes and said second infrared emitting diode means emitting said second code.

* * * * *